(12) United States Patent
Morris

(10) Patent No.: US 9,071,818 B2
(45) Date of Patent: Jun. 30, 2015

(54) VIDEO COMPRESSION SYSTEM AND METHOD USING DIFFERENCING AND CLUSTERING

(75) Inventor: Mark Morris, Alexandria, VA (US)

(73) Assignee: Organizational Strategies International Pte. Ltd., Singapore (SG)

( * ) Notice: Subject to any disclaimer, the term of this patent is extended or adjusted under 35 U.S.C. 154(b) by 152 days.

(21) Appl. No.: 13/220,812

(22) Filed: Aug. 30, 2011

(65) Prior Publication Data

US 2013/0051476 A1 Feb. 28, 2013

(51) Int. Cl.
| H04N 7/173 | (2011.01) |
| H04N 19/20 | (2014.01) |
| H04N 19/137 | (2014.01) |
| H04N 19/132 | (2014.01) |
| H04N 19/182 | (2014.01) |

(52) U.S. Cl.
CPC ... *H04N 19/00127* (2013.01); *H04N 19/00387* (2013.01); *H04N 19/00145* (2013.01); *H04N 19/00303* (2013.01)

(58) Field of Classification Search
CPC .................. H04N 19/00387; H04N 19/00127; H04N 19/00303; H04N 19/00145; H04N 19/00578; H04N 21/258
USPC .............................. 725/95; 382/199; 709/225
See application file for complete search history.

(56) References Cited

U.S. PATENT DOCUMENTS

| 5,612,744 | A  | * | 3/1997  | Lee et al. ................... 348/416.1 |
| 6,041,078 | A  | * | 3/2000  | Rao .......................... 375/240.16 |
| 6,654,420 | B1 | * | 11/2003 | Snook ....................... 375/240.16 |
| 6,674,904 | B1 | * | 1/2004  | McQueen ..................... 382/199 |
| 7,546,334 | B2 | * | 6/2009  | Redlich et al. ................ 709/201 |
| 8,135,232 | B2 | * | 3/2012  | Kimura ........................ 382/268 |
| 8,402,551 | B2 | * | 3/2013  | Lee ................................ 726/27 |
| 8,447,117 | B2 | * | 5/2013  | Liao et al. ..................... 382/199 |
| 2002/0112181 | A1 | * | 8/2002 | Smith ........................... 713/201 |
| 2003/0036886 | A1 | * | 2/2003 | Stone ........................... 702/188 |
| 2004/0091151 | A1 | * | 5/2004 | Jin et al. ....................... 382/199 |
| 2005/0138110 | A1 | * | 6/2005 | Redlich et al. ................ 709/201 |
| 2005/0193311 | A1 | * | 9/2005 | Das et al. ...................... 714/753 |
| 2008/0005666 | A1 | * | 1/2008 | Sefton et al. .................. 715/523 |
| 2008/0163378 | A1 | * | 7/2008 | Lee ................................ 726/27 |
| 2009/0178019 | A1 | * | 7/2009 | Bahrs et al. ................... 717/104 |
| 2009/0178144 | A1 | * | 7/2009 | Redlich et al. ................. 726/27 |
| 2009/0254572 | A1 | * | 10/2009 | Redlich et al. ................. 707/10 |
| 2010/0005179 | A1 | * | 1/2010 | Dickson et al. ............... 709/228 |
| 2010/0158402 | A1 | * | 6/2010 | Nagase et al. ................ 382/255 |
| 2010/0250497 | A1 | * | 9/2010 | Redlich et al. ............... 707/661 |
| 2011/0110603 | A1 | * | 5/2011 | Ikai ............................... 382/260 |

(Continued)

OTHER PUBLICATIONS

Gonzalez et al., "Digital Image Processing", New Jersey: Prentice Hall, 2007, pp. 818-823.*

(Continued)

*Primary Examiner* — Nasser Goodarzi
*Assistant Examiner* — Michael B Pierorazio
(74) *Attorney, Agent, or Firm* — Vierra Magen Marcus LLP

(57) ABSTRACT

A video compression system and method to isolate and capture video data for video compression, thereby eliminating the need for motion vectors and blocks. When data is captured from a video input device, such as a video camera, the data is captured and isolated into clusters of difference image data. The clusters are then scanned, filled, marked, split and blended in in order to compress the video data.

9 Claims, 14 Drawing Sheets

(56) References Cited

U.S. PATENT DOCUMENTS

| | | | |
|---|---|---|---|
| 2011/0129156 A1* | 6/2011 | Liao et al. | 382/199 |
| 2011/0164824 A1* | 7/2011 | Kimura | 382/199 |
| 2012/0030733 A1* | 2/2012 | Andrews et al. | 726/4 |
| 2012/0173971 A1* | 7/2012 | Sefton et al. | 715/256 |
| 2012/0252407 A1* | 10/2012 | Poltorak | 455/410 |
| 2012/0321083 A1* | 12/2012 | Phadke et al. | 380/255 |
| 2013/0051476 A1* | 2/2013 | Morris | 375/240.24 |
| 2013/0063241 A1* | 3/2013 | Simon | 340/3.1 |
| 2013/0091290 A1* | 4/2013 | Hirokawa et al. | 709/227 |

OTHER PUBLICATIONS

Gonzalez et al., "Digital image processing", New Jersey: Prentice Hall. 2007, pp. 818-823.

Search report from P.C.T., mail date is Nov. 13, 2012.

* cited by examiner

SWS

SKP

FIG. 11A
FIG. 11B
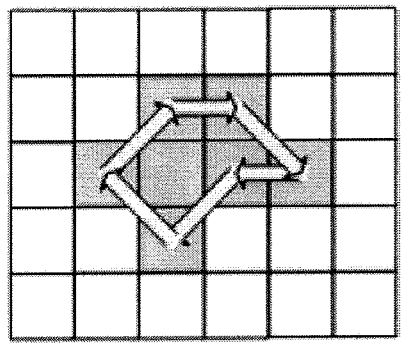
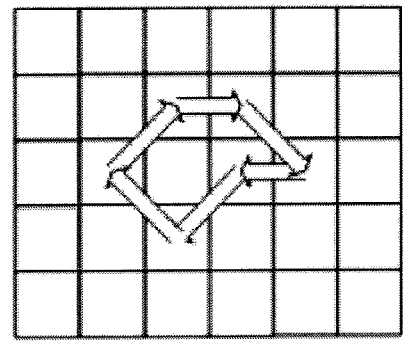
FIG. 12A
FIG. 12B
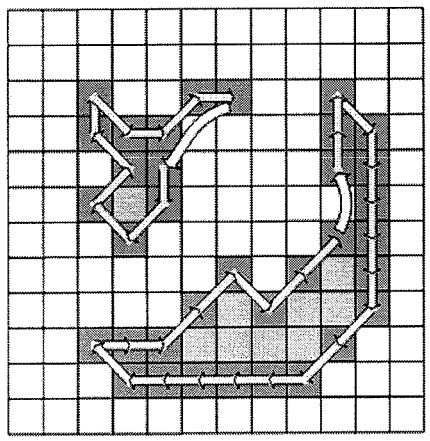
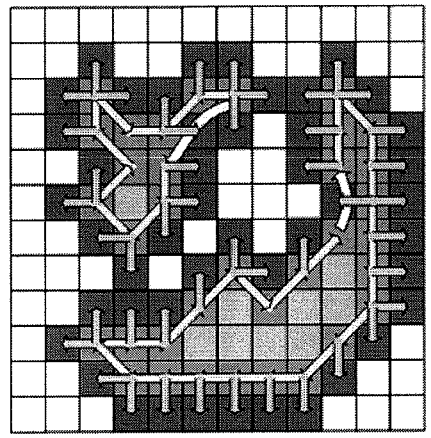
FIG. 12C
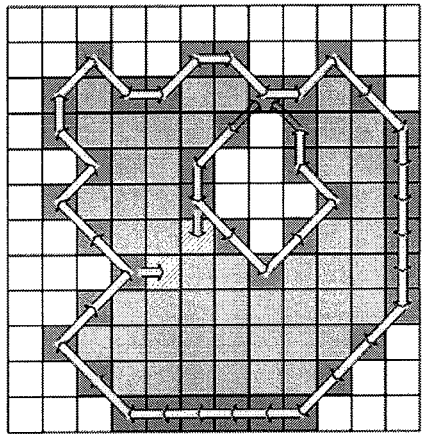

FIG. 17
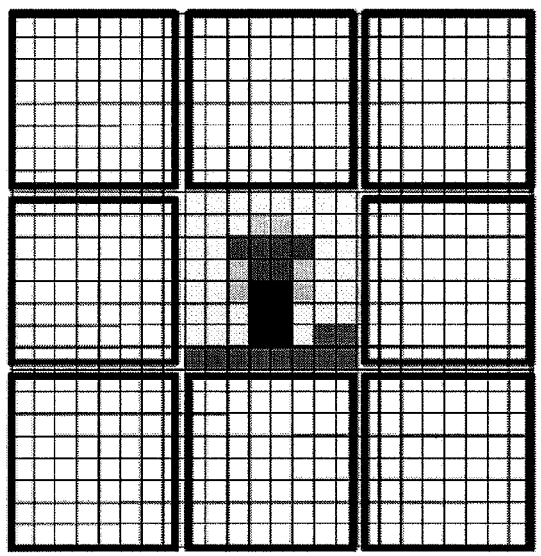
FIG. 18A    FIG. 18B    FIG. 18C
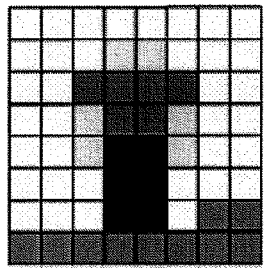 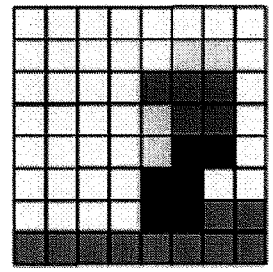 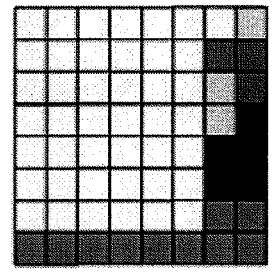

VIDEO COMPRESSION SYSTEM AND METHOD USING DIFFERENCING AND CLUSTERING

BACKGROUND

1. Field of the Disclosure

The present disclosure relates to the field of video compression. More particularly, the present disclosure relates to isolating and capturing video data for video compression.

2. Background Information

As video data is increasingly used in computer systems in applications such as video conferencing and video recording, computer systems often cannot keep pace with the computational requirements of video data. Video data streams typically have extremely large bandwidth requirements that can burden the capabilities of even the most high-speed processor to compress the video data for storage or for transmission across a computer network or a telephone system. This compression is typically performed by a central processing unit (CPU) in a computer system with a resulting loss in image clarity due to the failure of the CPU to keep pace with the video data. Complex scenes having many elements that are in motion represent the greatest challenge because they place a tremendous burden on the CPU during the compression and data transfer processes.

Thus, enabling real time video transmission requires a large amount of data compression. Data compression may, however, compromise picture quality. Therefore, great efforts have been made to develop compression techniques allowing real time transmission of high quality video over bandwidth limited data connections. In video compression systems, the main goal is to represent the video information with as little capacity as possible. The most common video coding method is described in the MPEG and H.26 standards.

A time-consuming step in the compression of video data is to compute differences between successive video frames. A CPU typically computes a difference frame by reading a current video frame into memory and computing the difference between the current video frame and a previous video frame, which was previously stored into a memory in the computer system. Computing the difference typically involves performing an exclusive-OR operation between the current video frame and the previous video frame. In general, any function that effectively represents the difference between two successive video frames can be used with only minor modifications to the related compression algorithm. Hence, a large number of possible functions can be used to compute the difference between successive video frames.

SUMMARY OF THE INVENTION

The invention relates to the field of video compression for isolating and capturing video data for video compression.

In one embodiment, there is a method for compressing video data in a network system, including receiving a current video frame from a video input; calculating differences between the current video frame and a previous video frame; and processing the calculated differences to determine clusters of image data for compression.

In one aspect, the method includes scanning the clusters of image data to locate outer rim nodes surrounding the cluster of image data; and determining unprocessed difference points in the image data; and when the unprocessed difference points are found, marking the points as outer rim nodes surrounding the cluster of image data, and when all of the unprocessed difference points have been found, compressing outer rim data representing the outer rim nodes.

In another aspect, the method includes eliminating redundant rim nodes; scanning along an interior of the outer rim nodes to detect adjacent internal rims; scanning the outer rim nodes and adjacent rim nodes to locate unfilled internal points; recursively filling unfilled internal points and color capture; and locating floating internal rims using the recursive fill.

In another aspect, the method includes placing a sum of the current video frame and a future video frame captured colors in blocks; placing a difference of the current video frame and the future video frame capture colors in blocks; and compressing the blocks.

In another embodiment of the invention, there is a non-transitory computer readable medium storing a program for compressing video data in a network system, the network system including a computer receiving a current video frame, the program executable by the computer and including calculating differences between the current video frame and a previous video frame; and processing the calculated differences to determine clusters of image data for compression.

In still another embodiment, there is a network system for compressing video data in a network system, including a transmitter transmitting a current video frame; a receiver receiving a current video frame from the transmitter; and a processor: calculating differences between the current video frame and a previous video frame; and processing the calculated differences to determine clusters of image data for compression.

BRIEF DESCRIPTION OF THE DRAWINGS

FIGS. 11A and 11B show another exemplary image scan of data in accordance with the present invention.

FIGS. 12A-12C show another exemplary image scan of data in accordance with the present invention.

FIG. 17 shows an exemplary method to check image data in accordance with the present invention.

FIGS. 18A-18F show an exemplary diagram to stack or merge differences in accordance with the present invention.

DETAILED DESCRIPTION

In view of the foregoing, the present disclosure, through one or more of its various aspects, embodiments and/or specific features or sub-components, is thus intended to bring out one or more of the advantages as specifically noted below.

The present disclosure relates to the field of video compression. More particularly, the present disclosure relates to isolating and capturing video data for video compression.

Accordingly, the present invention provides a video compression technique that allows the playback of motion video through capturing differences between video frames. The technique leverages that fact that key differences between frames occur in clusters.

Figure 1:
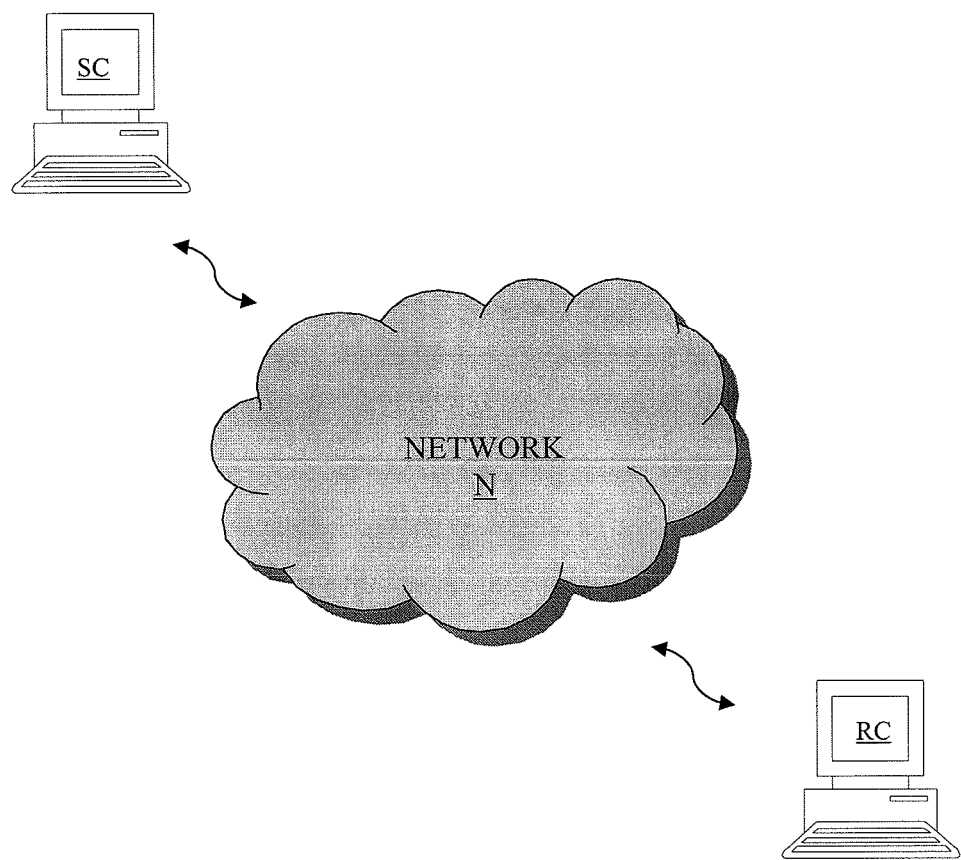
FIG. 1 shows an exemplary system in accordance with an embodiment of the present invention.

FIG. 1 shows an exemplary system in accordance with an embodiment of the present invention. System 1 includes, for example, a network N to which peripheral devices, such as computers SC and RC may be connected. The peripheral devices can include a processor and a set of instructions, such as an algorithm, that can be executed to cause the peripheral device to perform any one or more of the methods or computer based functions disclosed herein, as well as a video input that captures still and video image data. The video input may be incorporated as part of the peripheral device or a standalone device. It is also appreciated that although the peripheral device in the exemplary embodiments are computers, they are not limited to such an embodiment. For example, the peripheral device may be any mobile device, such as a smartphone, mobile phone, tablet, laptop, PDA, etc. The peripheral device may operate as a standalone device or may be connected, for example, using a network (any type of network may be used, as readily understood in the art), to other computer systems or peripheral devices. Additionally, the system is not limited to the illustrated embodiment, and may include any number or variation of networks and/or peripheral devices.

Figure 2:
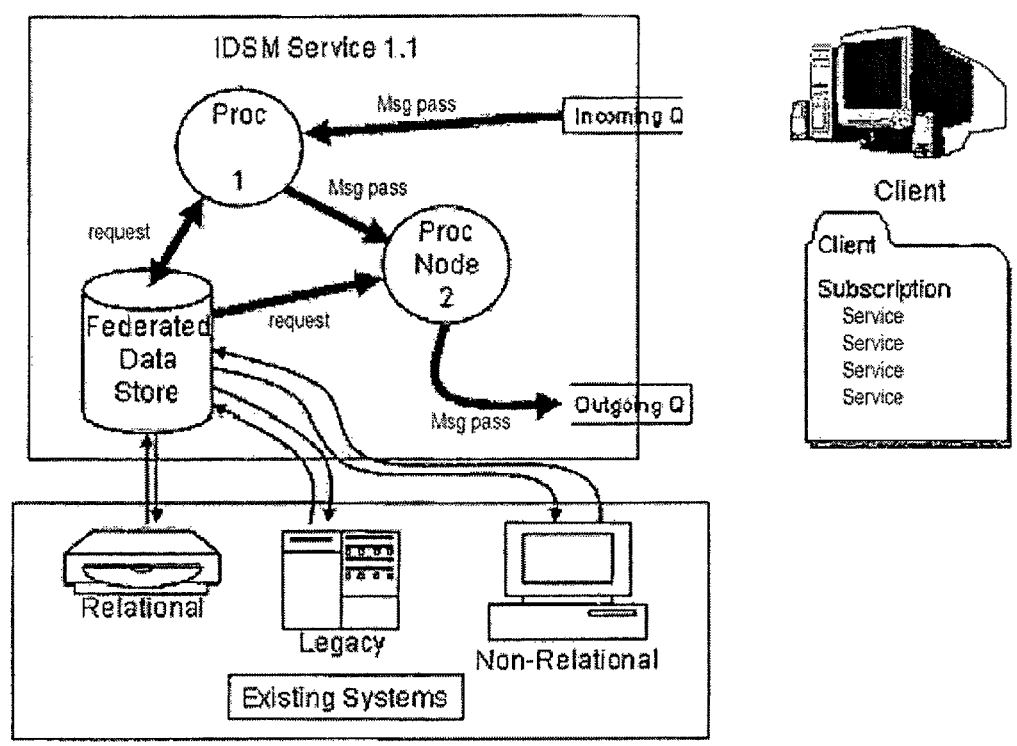
FIG. 2 shows another exemplary system in accordance with another embodiment of the present invention.

FIG. 2 shows another exemplary system in accordance with another embodiment of the present invention. The system application described herein uses a web services-based interface to validate users and connect them with their resources. These resources consist of information extracted from varied and diverse information repositories typically located in multiple departments and divisions across an enterprise. These repositories may reside in collections of word processor documents (e.g., Word), sophisticated relational databases (i.e., ORACLE, MySQL, SQL Server), document management systems (e.g., Documentum), flat-file databases, and even information "scraped" from the screen by the application interacting with the system as a normal user.

Figure 3:
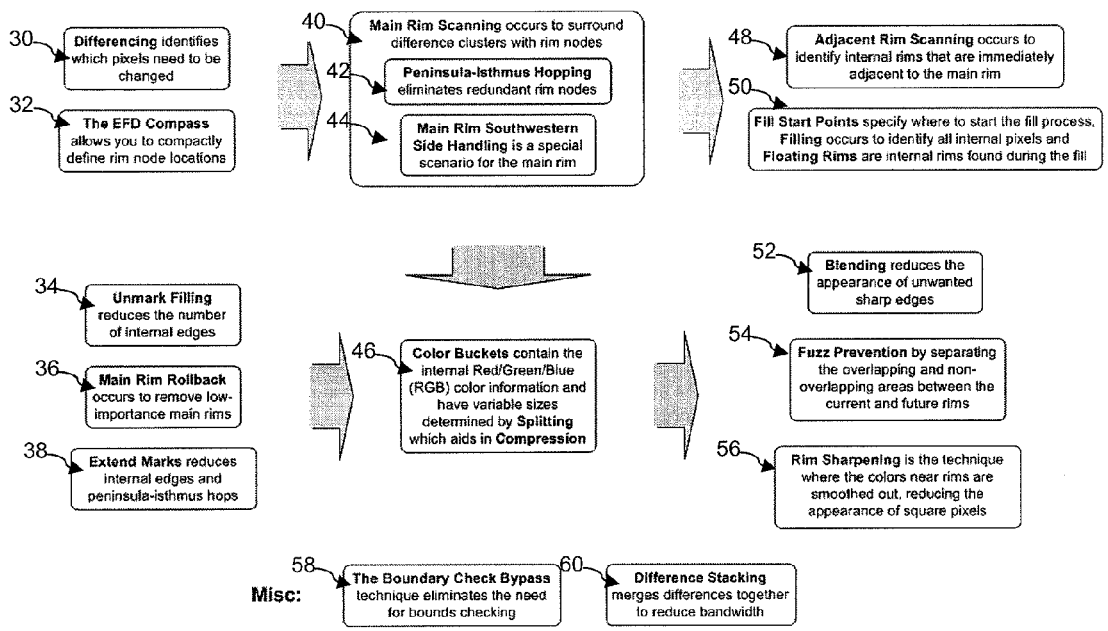
FIG. 3 shows an exemplary diagram of processing differences in accordance with the present invention.

FIG. 3 shows an exemplary diagram of processing differences in accordance with the present invention. Processing of video data, which may occur at the client end, user end, server end, or at a remote location (or any combination thereof), is accomplished in using the following system and method. Differencing 30 identifies pixels in the video data that require change based on, for example, various thresholds. In order to accomplish the identification, a compass 32 is used to represent direction and coordinates when scanning the data. Main rim scanning 40 acts to surround difference clusters with rim nodes, and eliminates redundant rim nodes using peninsula-isthmus hopping 42 and main rim southwestern side handling 44, as described in more detail below. Once completed, adjacent rim scanning 48 identifies internal rims that are immediately adjacent to the main rim, and fill start points 50 specifies where to begin the fill process, which identifies internal pixels and floating rims. The number of internal edges are reduced using unmark filling 34, low importance main rims are removed using main rim rollback 36 and internal edges and peninsula-isthmus hops are reduced using extend marks 38. To further aid in the compression of data, color buckets 46 include color spectrum information such as internal YBCBR or RGB color information and have variable sized determined by splitting blocks into smaller blocks to identify compression partitions. Blending 52 then reduces the appearance of unwanted sharp edges, and fuzz prevention 54 reduces the amount of distortion (i.e. "fuzz") caused by compression by separating the overlapping and non-overlapping areas between the current and future rims. Additionally, the rim sharpening 56 features further reduce the amount of distortion caused by compression by smoothing colors near the rims to reduce the appearance of square pixels. Other techniques, such as boundary check bypass 58 and difference stacking 60 can also be used to eliminate the need for bounds checking and to merge differences together to reduce bandwidth, respectively. Each of the above-mentioned methods are discussed in more detail below.

Figure 4:
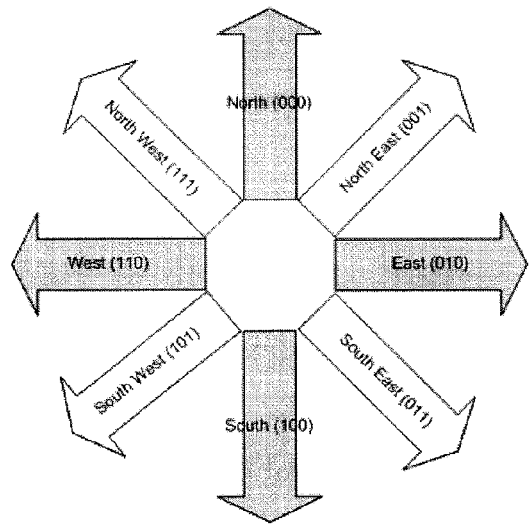
FIG. 4 shows an exemplary compass that is used in accordance with the present invention.

As explained above, in order to populate a two-dimensional difference array, each pixel in the current image is compared to the pixels in the prior image. If a color change of a pixel is more than a specified threshold, that pixel is marked as having a difference. To determine position or location of a pixel within an image, a compass 32 is used. FIG. 4 shows an exemplary compass that is used in accordance with the present invention. Using the compass, only three bits are required to represent a single direction. As there are eight directions, and it is not necessary to return to an immediately previous pixel or location, seven directions are possible for any directional move within the image. For example, if a previous rim node moved in an eastward direction to become the current pixel, then the direction of the next pixel will not be westward (which would be the previous pixel). Accordingly, three bits may be used to represent eight directions (north, northeast, east, southeast, south, southwest, west and northwest) on the compass. Since one bit is not used for directional purposes (7 bits are used, not 8), it can be used as a flag to indicate special nodes including additional data (e.g. the flag is used to mark adjacent rim origins, the end of adjacent rims and peninsula-isthmus hopper landing points). It is appreciated that the invention described is merely one embodiment, and not limited to the scope of the specification and drawings. For example, more or fewer directions, bits, etc. may be used.

Figure 5A:
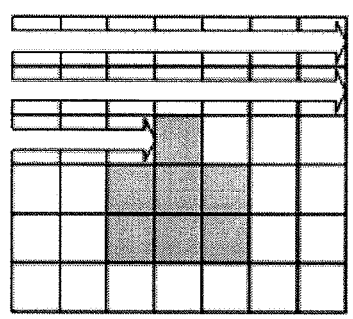
FIGS. 5A-5E show an exemplary scan of image data in accordance with the present invention.
Figure 5B:
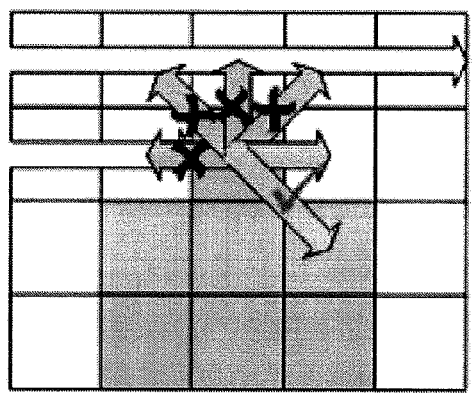
Figure 5C:
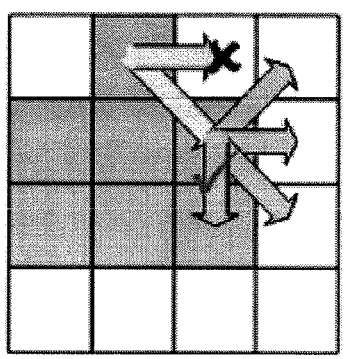
Figure 5D:
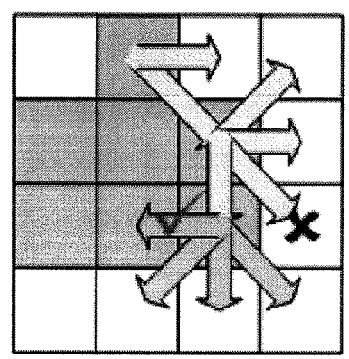
Figure 5E:
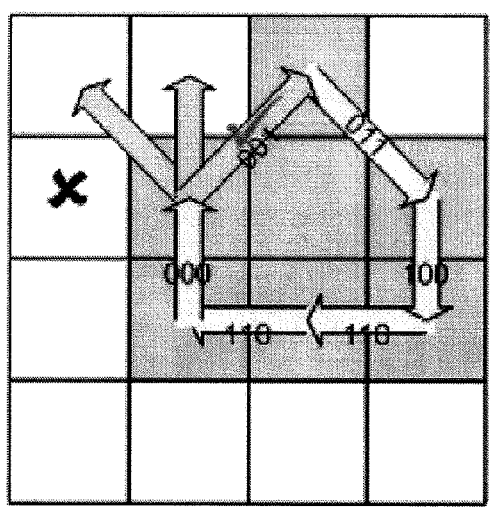

FIGS. 5A-5E show an exemplary scan of image data in accordance with the present invention. To find the outer (main) rim of an image, an initial scan of a difference array is performed, as illustrated in FIG. 5A. A scan of data will be described using an example, which example is not intended to limit the scope of the invention. In one embodiment, the initial scan starts at the top left of the image, and moves left to right for each row in the array. It is understood, however, that the scan may be performed in any way known to the skilled artisan. When a first difference in the data is detected, it is recognized that the next difference cannot be data (i.e. a pixel) in the west, north west, north or north east direction. Otherwise, these pixels would have been located during the scan. Therefore, the scan continues to the east, and then clockwise, through all compass coordinates until the next difference is determined (FIG. 5B). Once the next difference is determined, scanning ensues with a start direction related to the previous direction, as shown in FIGS. 5C and 5D. For example, if the previous direction was South, then the start direction is in the coordinate to the North East (FIG. 5C). If the previous direction was South East, then the start direction is in the coordinate to the North East (FIG. 5D). With reference to FIG. 5E, the scan continues until it returns to the main rim origin, unless a special case exists (discussed below with respect to Peninsula-Isthmus Hopping and Main Rim Southwestern Side Handling). Upon completion of the scan, the main rim may be represented as an x, y coordinate (the origin) and a sequence of three-bit directional nodes. Once points in the new difference cluster rim (rim and internal points) are determined, the initial scan will continue without scanning previously captured points.

Figure 6A:
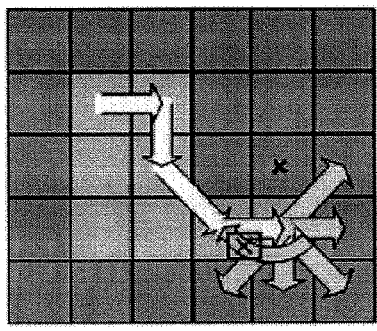
FIGS. 6A-6D show another exemplary scan of image data in accordance with the present invention.
Figure 6B:
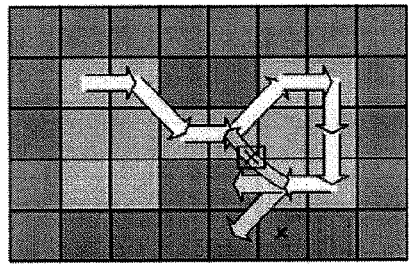
Figure 6C:
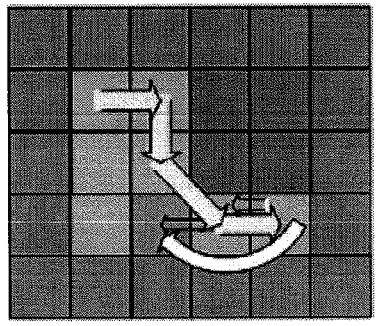
Figure 6D:
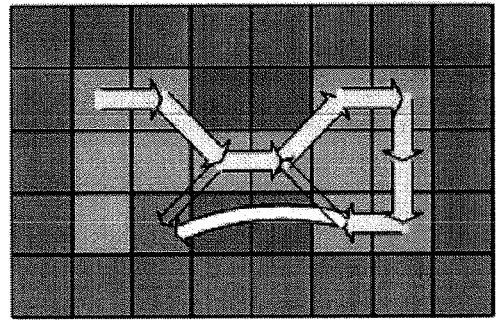

FIGS. 6A-6D show another exemplary scan of image data in accordance with the present invention. FIG. 6A shows data in the shape of a peninsula, where pixels of the data extend outward in a projecting manner from the main body of data. FIG. 6B shows data in the shape of an isthmus, where pixels of the data form a narrow strip connecting two larger bodies of data. Both peninsula and isthmus formations of pixels in the data provide difficulty in scanning. To avoid processing already processed rim nodes, a special Peninsula-Isthmus Hop is used, as depicted in FIGS. 6C and 6D. The Peninsula-Isthmus Hop begins from the rim node where the peninsula or isthmus is first detected (the "hop point") HP and will "hop" to the "landing point" LP. As depicted in the figures, the hop point is referenced with HP, and the landing point is reference by LP. Peninsula-Isthmus Hops are used primarily for the main rim, due to processing and storing size of information of the landing points. However, floating rims (described below) could also use Peninsula-Isthmus Hops to achieve similar benefits.

Figure 7A:
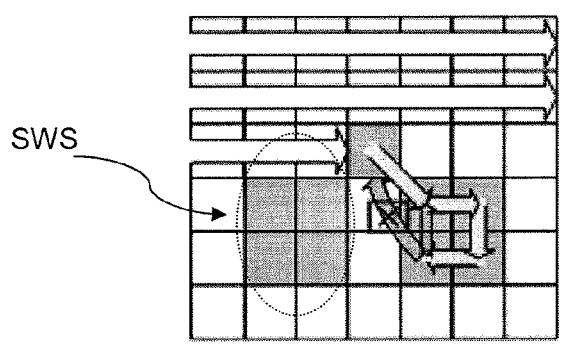
FIGS. 7A and 7B show another exemplary image scan of data in accordance with the present invention.
Figure 7B:
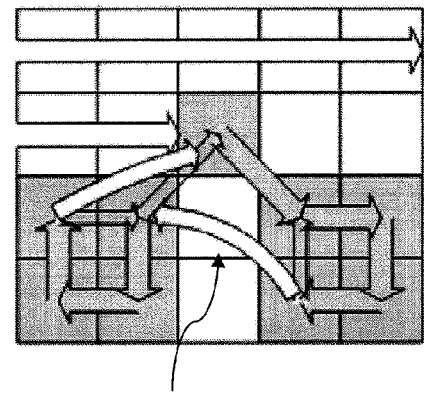

FIGS. 7A and 7B show another exemplary image scan of data in accordance with the present invention. If a main rim origin occurs on an isthmus, the entire "southwestern side" SWS will be skipped, as illustrated in FIG. 7A. In order to remedy this problem, the following is performed when searching for a landing point during peninsula-isthmus processing and the main rim origin is detected. A scan is performed around the origin, and any difference points that have not been processed as a rim node are set as a landing point LP. This will allow the hop function to "skip" over the main rim origin, as identified by arrow SKP. This is followed by continued scanning around the "southwester side" of the main rim, as illustrated in FIG. 7B.

Figure 8A:
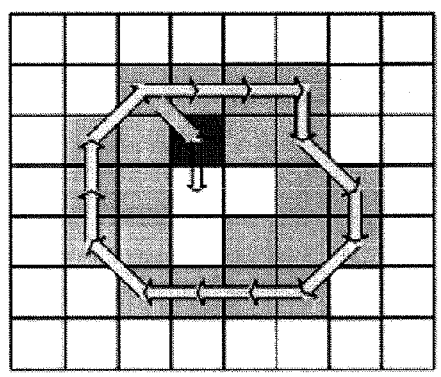
FIGS. 8A-8C show another exemplary image scan of data in accordance with the present invention.
Figure 8B:
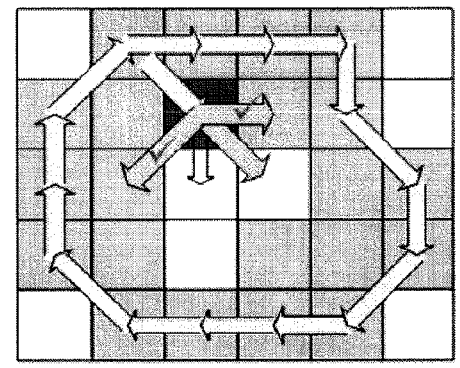
Figure 8C:
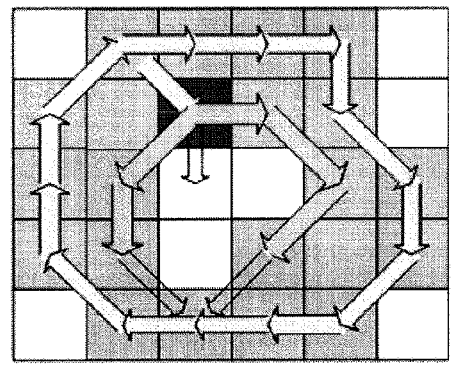

FIGS. 8A-8C show another exemplary image scan of data in accordance with the present invention. Once the main rim scan has occurred, the data is scanned (processed) for adjacent rims. The adjacent rim scan is performed by scanning along the interior of the main rim in search of any differences that have non-differences to the North, East, South and West (excluding already detected adjacent rim nodes). The detected rims will become adjacent rim origins. Non-differences to the Northeast, Southeast, Southwest and Northwest will be detected by other adjacent rim origins or turned into floating rims (described below). Alternatively, the scan may check all directions for non-differences and ignore "corner" single-point adjacent rims. Adjacent rims have a clockwise side and a counter-clockwise side (i.e. the scan is performed in the clockwise and counter-clockwise directions). In the clockwise direction, the scan is performed for differences starting one direction clockwise from the non-difference direction. In the counter-clockwise direction, the scan is performed for differences starting one direction counter-clockwise from the non-difference direction, as illustrated in FIGS. 8B and 8C. For example, in the counter-clockwise direction, when the previous direction was North, the start direction is Northeast, when the previous direction was Northeast, the start direction is Southeast, etc. Processing continues on each side until a previously processes rim node is found. Notably, adjacent rims may also have other adjacent rims, which may be processed recursively by scanning the adjacent rim for other adjacent rim origins (and at end points a full surrounding scan is performed).

Figure 9A:
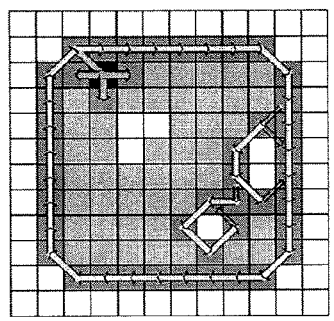
FIGS. 9A-9C show another exemplary image scan of data in accordance with the present invention.
Figure 9B:
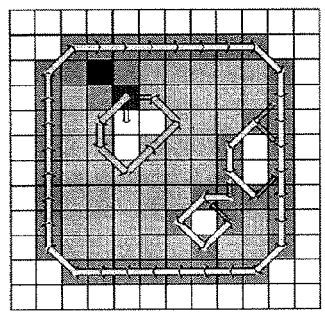
Figure 9C:
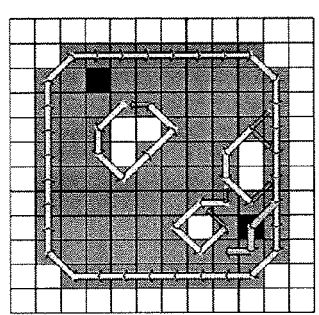

FIGS. 9A-9C show another exemplary image scan of data in accordance with the present invention. Internal, unfilled points (i.e. fill start points) are located by scanning the main rim and adjacent rims. When a fill start point is found, fill processing is performed recursively to fill each unfilled point to the North, East, South and West that is not a rim node (FIG. 9A). When processing a fill, a point that has a non-difference point to the North, East, South or West is set as a floating rim (FIG. 9B). Floating rims use an x,y coordinate for the origin, but are otherwise processed similar to adjacent rims with clockwise and counter-clockwise directions and without peninsula-isthmus hopping. Floating rims may also have adjacent rims next to them. Alternatively, floating rims may use peninsula-isthmus hops and discard the counter-clockwise direction. As shown in FIG. 9C, some points are not reachable with a single fill start point. Therefore, it may be necessary to provide more than one fill start point.

Figure 10A:
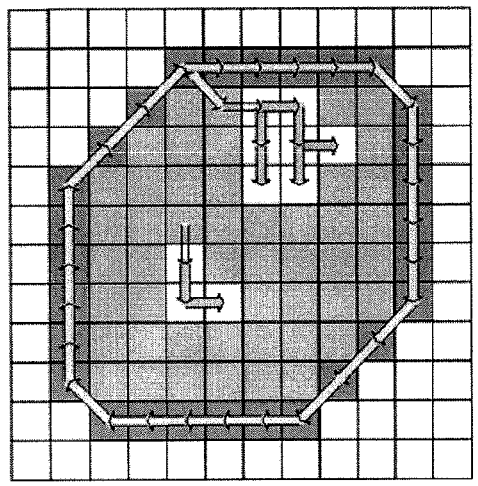
FIGS. 10A and 10B show another exemplary image scan of data in accordance with the present invention.
Figure 10B:
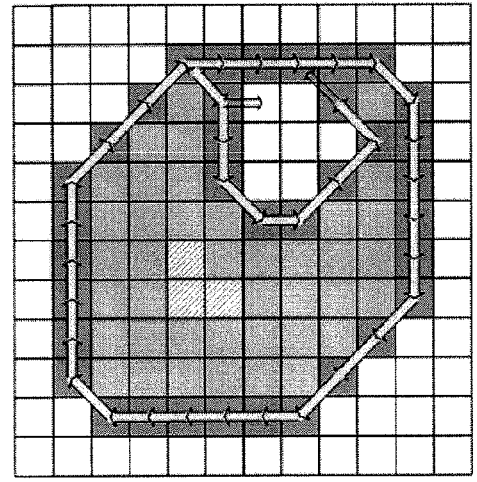

FIGS. 10A and 10B show another exemplary image scan of data in accordance with the present invention. In order to reduce the number of internal edges, specified difference (i.e. unmarked) areas are filled in the according to the following process. An unmarked threshold value is selected as the minimum number of pixels an unmarked area includes in order to avoid being filled. Prior to creating an adjacent or floating rim, the unmarked area for which an adjacent or floating rim is required is filled. This is accomplished using a temporary two-dimensional fill array, recursively filling non-difference points to the North, East, South and West. If the threshold is not met, unmarked points are flagged as difference points such that TGBs are included in the color buckets (described below), and an adjacent or floating rim is not created. For example, as illustrated in FIGS. 10A and 10B, with an unmarked threshold greater than three and less than or equal to seven, the adjacent rim would be created but a floating rim would be filled.

FIGS. 11A and 11B show another exemplary image scan of data in accordance with the present invention. In this example, small groups of differences are detected and flagged to be ignored. These smaller groups are typically caused, for example, by camera vibration and flux. A main rim rollback is performed when the number of total points (pixels) in the main rim is too small (as determined by a threshold). In frames that occur later in the process, the rolled-back differences may eventually accumulate and be captured. First, a rollback threshold is determined. If the total number of rime nodes and internal pixels is below the threshold, all pixels (the group of pixels) will be rolled back (i.e. differences will be marked as non-differences and will be ignored during the initial scan).

FIGS. 12A-12C show another exemplary image scan of data in accordance with the present invention. To reduce the number of main rims, peninsula-isthmus hops and internal edges, an extend marks process is performed (FIG. 12A). Performing an extend mark process will, when combined with unmark filling, help to reduce the number of bytes required to represent the rims. However, the extend marks process is not performed on rims that have been rolled back.

In the extend marks process, each rim (main and internal) are navigated and marked one pixel out from the rim as a difference in the North, East, South and West direction. The next clockwise (N/E/S/W) compass position is started from the reverse of the previous direction, and continued clockwise until the previous position from the next direction (e.g. for counter-clockwise side of internal rims, move one N/E/S/W position in the counter-clockwise direction from the reverse of the previous direction and continue counter-clockwise until the previous counter-clockwise position is reached from the next direction). At isthmus points, peninsula tips and internal rim start and end points, points are marked one out in each direction, as illustrated in FIG. 12B. As a result, nearby rims will merge and peninsulas will disappear. When extending marks on internal rims, the unmarked area will shrink, resulting in a greater likelihood it will be filled by the unmark filling process. The rim process with be re-processed using the new marked difference points, and new adjacent and floating rims may be removed by the unmark filling process (FIG. 12C). Internal YBCBRs or RGBs are placed into the color buckets (described below). The resulting extended rims have a smoother shape which allows for easier compression.

Figure 13:
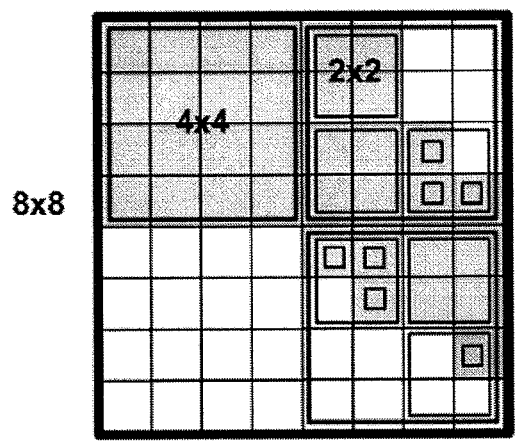
FIG. 13 illustrates an exemplary diagram of grouping and storage of image data in accordance with the present invention.

FIG. 13 illustrates an exemplary diagram of grouping and storage of image data in accordance with the present invention. Color buckets are used to group and store color information for internally filled areas, and to store color information associated with rim points. For example, the color buckets store YBCBR or RGB data in memory in 8×8, 4×4 and 2×2 blocks to facilitate compression. It is appreciated that the block dimensions are variable around the rim edges and that segregating pixel colors in this manner reduces the amount of color bleed caused by compression. Any method of compression may be used, such as discrete cosine transform (DCT) or wavelet transform, as readily understood. To populate the color buckets, in one embodiment, the following process is performed. Image data is scanned from an upper left corner to the upper right corner for each row. When a pixel requiring color capture is found, find the 8×8 bucket by performing using an x and y coordinate and dividing by 8, and truncating the remainder and using the remained to determine coordinates within an 8×8 bucket. Another scan from left to right for each row is performed. A counter is used and incremented in order to track how many pixel YBCBRs or RGBs were captured in the 8×8 color bucket. Scanning is continued, skipping over a process 8×8 buckets. 8×8 buckets with number of YBCBRs less than a predetermined number are then split into 4×4 blocks using. 8×8 buckets with a number of YBCBRs equal to or greater than the predetermined number have gaps filled with an averaging method for compression. 4×4 buckets with a number of YBCBRs less than a predetermined number are then split into 2×2 blocks using. 4×4 buckets with a number of YBCBRs equal to or greater than the predetermined number have gaps filled with an averaging method for compression. Similarly, 2×2 buckets with all YBCBRs present are compressed accordingly. 2×2 buckets with less than all of the YBCBRs present have them descaled by 8 for compression.

Figure 14A:
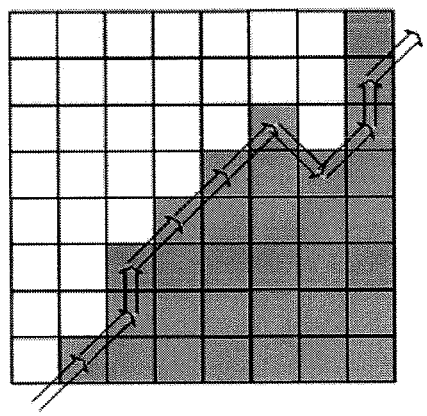
FIGS. 14A and 14B illustrate an exemplary process of blending image data in accordance with the present invention.
Figure 14B:
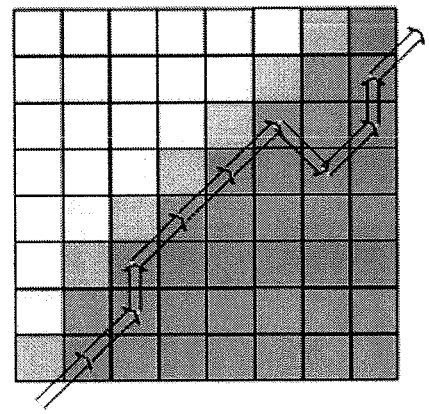

FIGS. 14A and 14B illustrate an exemplary process of blending image data in accordance with the present invention. Blending is performed to reduce color edges (represented by shades of gray in the figures) where similar colors often change. Prior to blending, a blend depth, similarity threshold and diagonal weight are established. The blend depth is defined as the number of pixels into the non-difference area (which number can be previously defined or automatically determined). For example, with unextended rims and a blend depth of one, non-difference pixels next to the rim nodes will be blended. On the other hand, for example, with extend marks active, a blend depth of one would blend every pixel on the rim. A blend depth of two, for example, would blend the rim pixels and one pixel outside the rims, and a blend depth of three would blend one pixel out from the second depth. Similarity threshold is defined as how similar a nearby influencing pixel is to the current or target pixel to trigger a blend. The similarity threshold acts to prevent areas with accurate color edges from being blended. Finally, flat and diagonal weights define how strongly nearby pixels influence each other. The color of a pixel that is targeted for blending (target pixel) will have its color altered by nearby blending influences. For example, if the blend influence is diagonal to the target (in a direction to the NE/SE/SW/NW), the influence will have less of an impact on the color alteration as a blend influence that is in a direction to the N/E/S/W. It is appreciated that any method for determining the impact of influence may be used, as readily understood in the art, and the invention is not limited to the described embodiment.

Figure 15A:
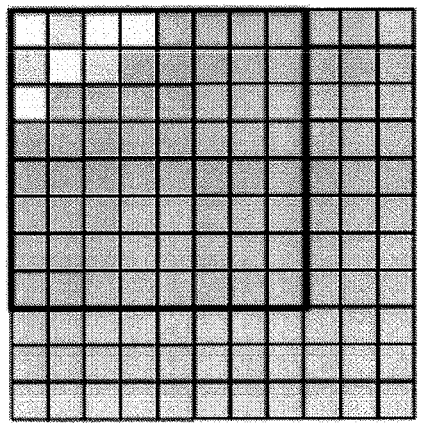
FIGS. 15A-15I show exemplary embodiment of correcting an unclear image in accordance with the present invention.
Figure 15B:
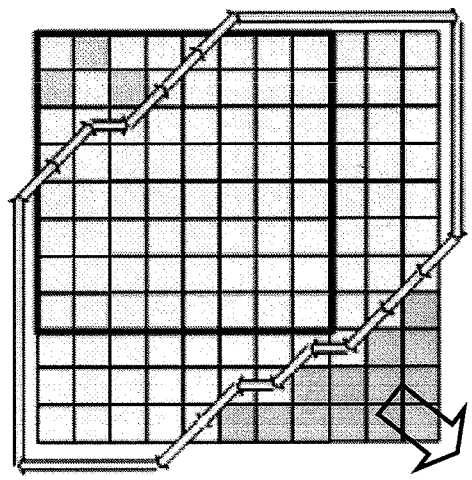
Figure 15C:
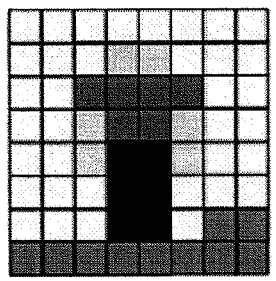
Figure 15D:
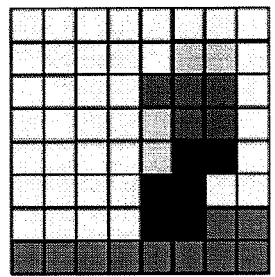
Figure 15E:
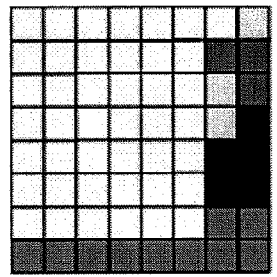
Figure 15F:
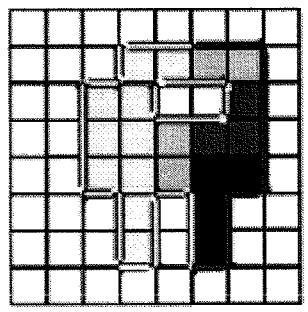
Figure 15G:
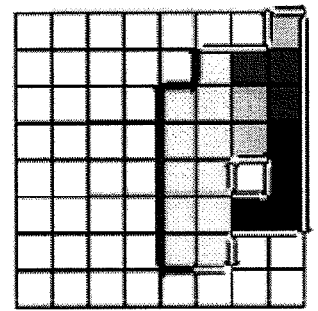
Figure 15H:
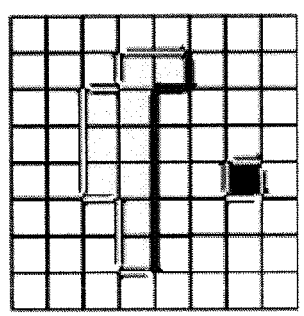
Figure 15I:
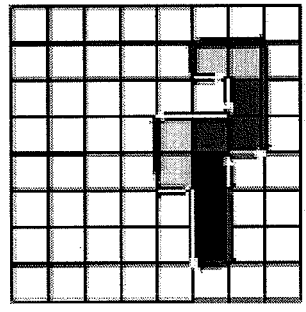
Figure 18D:
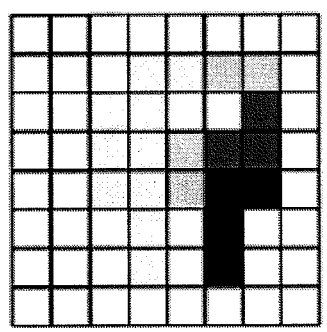
Figure 18E:
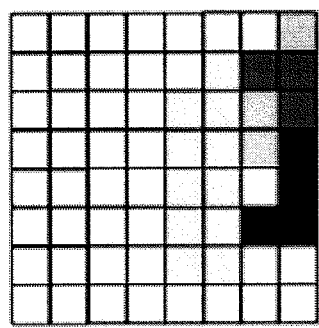
Figure 18F:
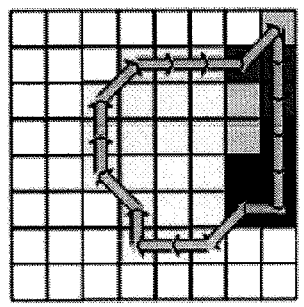

FIGS. 15A-15I show exemplary embodiment of correcting an unclear image in accordance with the present invention. In this embodiment, a basic color correction is performed. Due to color compression, edges of objects in the image often become unclear or fuzzy. Since rims are created by differencing uncompressed original images, situations occur in which "dangling fuzz" occurs as a result of a moving image. For example, with reference to FIGS. 15A and 15B, if an original 8×8 block of data does not have any rims passing through the block, any color edges will be unclear after compression. If the object causing the color edge moves, the clarity (fuzz) will dangle since it occurs outside of the differenced area. To prevent trailing fuzz from occurring, the rims are used to identify where a trailing edge is located, and then places a color around the edge into separate color buckets. This is accomplished, for example, by using a single frame buffer to "look-ahead" to one rim in a future frame since the future rim will include the trailing edge of the current moving object. FIGS. 15C, 15D and 15E show a previous frame, a current frame and a future frame, respectively, of a moving object. FIGS. 15F, 15G, 15H and 15I show a current rim, future rim, current less future and current plus future, respectively, of the moving object. Using a filled area of the future rim, points existing in both the current and future rims are placed into a color bucket. Points existing in the current rim, but not the future rim, will go into a different color bucket. The colors from the current difference cluster are placed into these two color buckets. To eliminate redundant processing, the future rim is used as the current rim for the next frame.

Figure 16A:
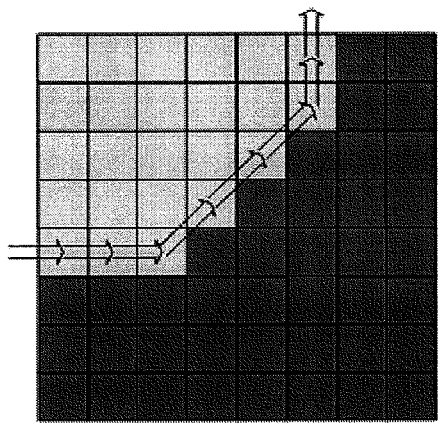
FIGS. 16A and 16B show an exemplary embodiment of correcting an unclear image in accordance with the present invention.
Figure 16B:
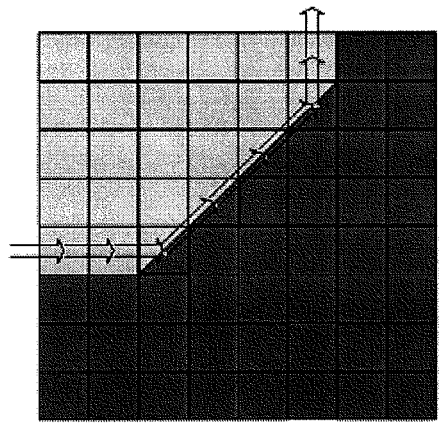

FIGS. 16A and 16B show an exemplary embodiment of correcting an unclear image in accordance with the present invention. By using edge-focused differencing with trailing-edge detection (described below above with respect to FIGS. 15A-15I), the most visible edges of objects in motion are captured. With the rim coordinates known from rim scanning, sharpening of the edges is simplified. In this way, when a video is zoomed in upon (and single pixels may be stretched to cover multiple pixels) any stretched pixels near the rims that are next to contrasting colors can be made to look less square, greatly enhancing overall image quality. For example, FIG. 16A shows pixels of a zoomed in image without rim sharpening, and FIG. 16B shows pixels of a zoomed in image for which rim sharpening has been processed. Additionally, edge-focused differencing may be used in combination with global motion compensation (which adjusts for camera movement) and may still be applied between the globally-shifted frames of image data.

FIG. 17 shows an exemplary diagram to check image data in accordance with the present invention. In order to eliminate the need to check image boundaries, an 8 pixel wide border is added around each of the data arrays. When edge processing, coordinates beyond the border will not be used. Rather, every x and y coordinate is shifted by 8 pixels to translate to and from the real coordinate.

FIGS. 18A-18F show an exemplary diagram to stack or merge differences in accordance with the present invention. Using differencing techniques, each difference is transmitted to a client in order to avoid overall image quality. With differencing, it is essential that every difference be transmitted to the client. Any missed differences will corrupt the overall image. If there is a transmission delay and several differences are pending transmission to the client, it is possible to apply "difference stacking" to stack or merge the differences into a single difference to reduce bandwidth. The left to right scan to find the outer rim origins for the new stacked clusters can be skipped. The stacked outer origin will be the highest left-most outer origin from the rims that were stacked. The most recent colors of the "stacked difference" will be captured and no extend marks or unmark filling will occur. As another performance improvement, compressed color blocks that can be decoded independently of each other can remain compressed until stacking is finished. Any of these blocks that were fully overwritten by newer blocks can be ignored, reducing the number of blocks that are decompressed.

Figure 19:
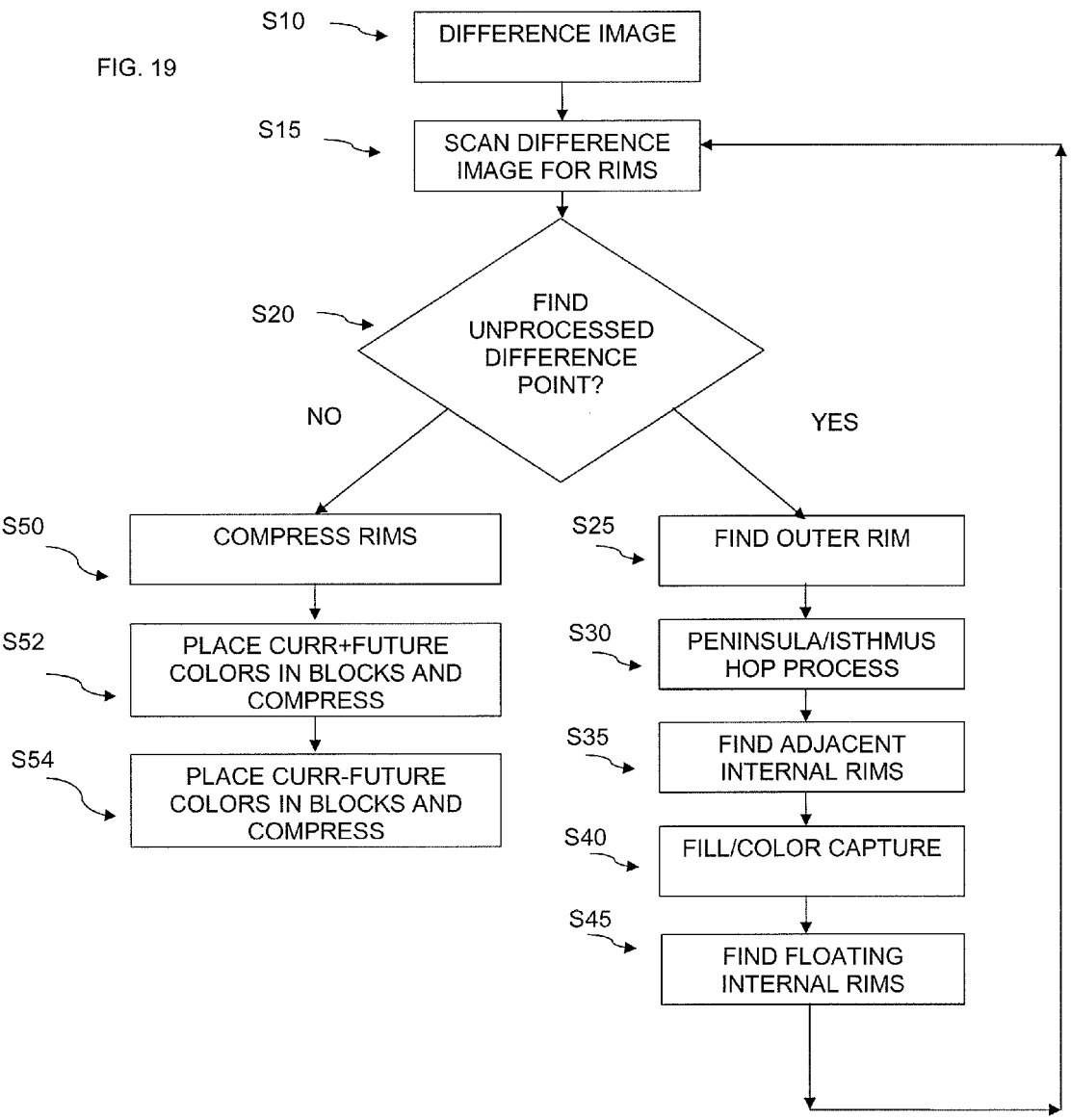
FIG. 19 shows an exemplary flow diagram in accordance with the present invention.

FIG. 19 shows an exemplary flow diagram in accordance with the present invention. The process flow in accordance with an embodiment of the invention is described below. Processing is typically performed at one of the client peripheral devices, although is not limited to such an embodiment. The process begins at S10 where differences are calculated between a first image (e.g. current image) and second image (e.g. previous image). The differences are clustered and scanned to form rim nodes surrounding the clustered data at S15. In S15, redundant rim nodes may also be eliminated using peninsula-isthmus hopping and main rim southwestern side handling. When scanning (S20), if unprocessed difference points are found, the process continues to S25. At S25, the outer rim is located. The number of internal edges are reduced using unmark filling, and low importance outer rims are removed using main rim rollback and internal edges and peninsula-isthmus hops are reduced using extend marks at S30. Adjacent internal rim scanning identifies internal rims that are immediately adjacent to the outer rim at S35, and fill start points specify where to begin the fill process at S40, which identifies internal pixels and floating rims at S45. If no unprocessed difference points are found at S20, then the rims are compressed at S50, the current plus future colors are placed in the blocks and compressed at S52 and color spectrum information (such as YBCBR or RGB) are placed into blocks, blending reduces the appearance of unwanted sharp edges and the resulting data is compressed at S54.

It is also noted that rim compression can be based on the general tendency of rims to go in one general direction for extended periods (which often occurs along smooth edges around moving objects). To take advantage, a rim scan can be performed to seek out stretches where there is a high frequency of the same three directions. Rather than representing the directions with a compass coordinate, as described above, Huffman encoding can be used to compress them.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for compressing video data in a network system, comprising:
   receiving a current video frame from a video input;
   calculating differences between the current video frame and a previous video frame;
   processing the calculated differences to capture and isolate distinct clusters of image data for compression;

determining unprocessed difference points in the clusters of image data, thereby eliminating use of motion vectors;

scanning the clusters of image data to locate outer rim nodes surrounding the cluster of image data; and when the unprocessed difference points are found, marking the points as outer rim nodes surrounding the cluster of image data, and when all of the unprocessed difference points have been found, compressing outer rim data representing the outer rim nodes.

2. The system for sharing secure information according to claim 1, further comprising:

eliminating redundant rim nodes;

scanning along an interior of the outer rim nodes to detect adjacent internal rims;

scanning the outer rim nodes and adjacent rim nodes to locate unfilled internal points;

recursively filling unfilled internal points and color capture; and locating floating internal rims using the recursive fill.

3. The method according to claim 1, further comprising:

placing a sum of the current video frame and a future video frame captured colors in blocks;

placing a difference of the current video frame and the future video frame capture colors in blocks; and compressing the blocks.

4. A non-transitory computer readable medium storing a program for compressing video data in a network system, the network system including a computer receiving a current video frame, the program executable by the computer and comprising:

calculating differences between the current video frame and a previous video frame;

processing the calculated differences to capture and isolate distinct clusters of image data for compression;

determining unprocessed difference points in the clusters of image data, thereby eliminating use of motion vectors;

scanning the clusters of image data to locate outer rim nodes surrounding the cluster of image data; and when the unprocessed difference points are found, marking the points as outer rim nodes surrounding the cluster of image data, and when all of the unprocessed difference points have been found, compressing outer rim data representing the outer rim nodes.

5. The method according to claim 4, further comprising:

eliminating redundant rim nodes;

scanning along an interior of the outer rim nodes to detect adjacent internal rims;

scanning the outer rim nodes and adjacent rim nodes to locate unfilled internal points;

recursively filling unfilled internal points and color capture; and locating floating internal rims using the recursive fill.

6. The method according to claim 4, further comprising:

placing a sum of the current video frame and a future video frame captured colors in blocks;

placing a difference of the current video frame and the future video frame capture colors in blocks; and compressing the blocks.

7. A network system for compressing video data in a network system, comprising:

a transmitter transmitting a current video frame;

a receiver receiving a current video frame from the transmitter; and a processor:

calculating differences between the current video frame and a previous video frame;

processing the calculated differences to capture and isolate distinct clusters of image data for compression;

determining unprocessed difference points in the clusters of image data, thereby eliminating use of motion vectors;

scanning the clusters of image data to locate outer rim nodes surrounding the cluster of image data; and when the unprocessed difference points are found, marking the points as outer rim nodes surrounding the cluster of image data, and when all of the unprocessed difference points have been found, compressing outer rim data representing the outer rim nodes.

8. The system for sharing secure information according to claim 7, further comprising:

eliminating redundant rim nodes;

scanning along an interior of the outer rim nodes to detect adjacent internal rims;

scanning the outer rim nodes and adjacent rim nodes to locate unfilled internal points;

recursively filling unfilled internal points and color capture; and locating floating internal rims using the recursive fill.

9. The method according to claim 7, further comprising:

placing a sum of the current video frame and a future video frame captured colors in blocks;

placing a difference of the current video frame and the future video frame capture colors in blocks; and compressing the blocks.

\* \* \* \* \*